United States Patent
Radovic

(10) Patent No.: US 9,195,593 B1
(45) Date of Patent: Nov. 24, 2015

(54) HARDWARE ASSISTED OBJECT MEMORY MIGRATION

(71) Applicant: Oracle International Corporation, Redwood Shores, CA (US)

(72) Inventor: Zoran Radovic, Alvsjo (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/598,166

(22) Filed: Jan. 15, 2015

Related U.S. Application Data

(60) Provisional application No. 62/056,524, filed on Sep. 27, 2014.

(51) Int. Cl.
- *G06F 13/00* (2006.01)
- *G06F 13/28* (2006.01)
- *G06F 12/02* (2006.01)

(52) U.S. Cl.
CPC .......... *G06F 12/0253* (2013.01); *G06F 12/023* (2013.01); *G06F 2212/1044* (2013.01); *G06F 2212/702* (2013.01)

(58) Field of Classification Search
CPC ...................... G06F 12/0253; G06F 2212/1044
See application file for complete search history.

(56) References Cited

U.S. PATENT DOCUMENTS

| | | | |
|---|---|---|---|
| 3,868,632 A | 2/1975 | Hong et al. | |
| 4,608,687 A | 8/1986 | Dutton | |
| 4,646,312 A | 2/1987 | Goldsbury et al. | |
| 4,761,785 A | 8/1988 | Clark et al. | |
| 5,014,273 A | 5/1991 | Gagliardo et al. | |
| 5,081,626 A | 1/1992 | Scott | |
| 5,276,834 A | 1/1994 | Mauritz et al. | |
| 5,305,326 A | 4/1994 | Solomon et al. | |
| 5,577,243 A | 11/1996 | Sherwood et al. | |
| 5,627,965 A | 5/1997 | Liddell et al. | |
| 5,745,508 A | 4/1998 | Prohofsky | |
| 5,754,567 A | 5/1998 | Norman | |
| 5,856,987 A | 1/1999 | Holman | |
| 5,872,798 A | 2/1999 | Baggen et al. | |
| 5,889,940 A | 3/1999 | Liddell et al. | |
| 6,035,432 A | 3/2000 | Jeddeloh | |
| 6,038,684 A | 3/2000 | Liddell et al. | |
| 6,047,392 A | 4/2000 | Liddell et al. | |
| 6,049,893 A | 4/2000 | Liddell et al. | |
| 6,092,218 A | 7/2000 | Liddell et al. | |
| 6,134,672 A | 10/2000 | Liddell et al. | |
| 6,134,679 A | 10/2000 | Liddell et al. | |
| 6,141,766 A | 10/2000 | Liddell et al. | |
| 6,170,068 B1 | 1/2001 | Liddell et al. | |
| 6,173,416 B1 | 1/2001 | Liddell et al. | |
| 6,480,982 B1 | 11/2002 | Chan et al. | |
| 6,519,704 B1 | 2/2003 | Liddell et al. | |
| 6,539,513 B1 | 3/2003 | Chen | |
| 6,574,768 B2 | 6/2003 | Cypher | |

(Continued)

*Primary Examiner* — Eric S Cardwell
(74) *Attorney, Agent, or Firm* — Rory D. Rankin; Meyertons, Hood, Kivlin, Kowert, Goetzel, P.C.

(57) ABSTRACT

Systems and methods for utilizing memory version instructions and techniques in conjunction with garbage collection in a processor. A hardware-assisted garbage collection algorithm may be executed by a computing system to move live objects between memory regions. Special store instructions may be utilized to mark the live objects of each memory region that is about to be migrated. Mutators performing useful work may be configured to trap on a memory region which is marked for migration.

20 Claims, 12 Drawing Sheets

(56) References Cited

U.S. PATENT DOCUMENTS

| | | |
|---|---|---|
| 6,804,799 B2 | 10/2004 | Zuraski, Jr. |
| 6,912,686 B1 | 6/2005 | Rodriguez et al. |
| 6,973,613 B2 | 12/2005 | Cypher |
| 7,020,811 B2 | 3/2006 | Byrd |
| 7,036,066 B2 | 4/2006 | Weibel et al. |
| 7,099,659 B1 | 8/2006 | Schnake et al. |
| 7,103,824 B2 | 9/2006 | Halford |
| 7,188,296 B1 | 3/2007 | Cypher |
| 7,257,666 B2 | 8/2007 | Komatsu et al. |
| 7,530,008 B2 | 5/2009 | Das et al. |
| 7,788,506 B2 | 8/2010 | Bancel et al. |
| 7,992,061 B2 | 8/2011 | Zeng |
| 8,572,441 B2 | 10/2013 | Gove et al. |
| 8,751,736 B2 | 6/2014 | Radovic et al. |
| 8,756,363 B2 | 6/2014 | Radovic et al. |
| 9,043,559 B2 | 5/2015 | Radovic et al. |
| 2003/0074630 A1 | 4/2003 | Batson et al. |
| 2004/0250028 A1 | 12/2004 | Daniels et al. |
| 2004/0255225 A1 | 12/2004 | Takai |
| 2008/0022154 A1 | 1/2008 | Endou |
| 2008/0228770 A1* | 9/2008 | Halcrow et al. .......... 707/8 |
| 2011/0029809 A1 | 2/2011 | Dhuse et al. |
| 2012/0137074 A1 | 5/2012 | Kim et al. |
| 2013/0036332 A1* | 2/2013 | Gove et al. .......... 714/54 |
| 2014/0115283 A1* | 4/2014 | Radovic et al. .......... 711/162 |

\* cited by examiner

Memory Corruption
Detection State

"0"

"1"

| MISMATCH | | Memory Stored Version Number | | |
|---|---|---|---|---|
| | | A | B | Reserved |
| Memory Access Address Version Number from Processor | A | 0 | 1 | 0 |
| | B | 1 | 0 | 0 |
| | Reserved | 1 | 1 | 0 |

FIG. 4

HARDWARE ASSISTED OBJECT MEMORY MIGRATION

PRIORITY INFORMATION

This application claims benefit of priority to U.S. Provisional Application Ser. No. 62/056,524 titled "Hardware Assisted Object Memory Migration" filed Sep. 27, 2014, which is hereby incorporated by reference in its entirety as though fully and completely set forth herein.

BACKGROUND OF THE INVENTION

1. Technical Field

This invention relates to computing systems, and more particularly, to memory management of computer systems using what has come to be known as "garbage collection".

2. Description of the Relevant Art

In the field of computer systems, considerable effort has been expended on the task of allocating and managing memory. In general, memory may be allocated to data objects (which may also be referred to as data structures or records) either statically or dynamically. Some computer languages may require that memory be allocated for all the variables defined in a program statically, e.g., at compile time. Such static memory allocation may make it difficult to share available memory space among multiple applications, especially for applications that are long-lived. Abiding by space limitations may be easier when the platform provides support for dynamic memory allocation, e.g., when memory space to be allocated to a given object is determined only at run time.

Dynamic allocation has a number of advantages over static allocation. One such advantage is that the run-time system is able to adapt allocation to run-time conditions. For example, the programmer can specify that space should be allocated for a given object only in response to a particular run-time condition. The C-language library function malloc( ) and the C++ operator new may be used for this purpose. Conversely, the programmer can specify conditions under which memory previously allocated to a given object can be reclaimed for reuse. The C-language library function free( ) and C++ operator delete results in such memory reclamation. Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements may grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "live" or "reachable." (Unreachable space may be termed "garbage", hence the name of the technique.) Statically allocated objects represented by a program's global variables are normally considered reachable throughout a program's life. Such objects are not ordinarily stored in the garbage collector's managed memory space (e.g., the heap), but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a root set, e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

In view of the above, efficient methods and mechanisms for performing garbage collection are desired.

SUMMARY

Systems and methods for utilizing memory version instructions and techniques in conjunction with garbage collection are contemplated.

In one embodiment, during execution of a computer program by a computing system, data objects allocated in a physical memory may be associated with version numbers. In one embodiment, a Java™ virtual machine (JVM) may be initialized so that memory versioning is enabled on the heap region where objects are managed. (Java is a trademark or registered trademark of Oracle and/or its affiliates). Operating system (OS) calls may be used to inform the OS about which virtual address (VA) space should be managed as memory corruption detection (MCD) regions.

In one embodiment, a hardware-assisted garbage collection algorithm may be executed by the computing system to move live objects from one or more memory regions to another "clean" region. While objects are being migrated, the objects may be stored in a compact format in the new, "clean" region to minimize memory fragmentation. In one embodiment, the garbage collection algorithm may fully bypass the OS by performing live-set marking using JVM-level load/store instructions to mark the live-set of each memory region that is about to be migrated. The garbage collection algorithm may enable concurrent and continuous fine-grain object migration that scales with application heap sizes so that Java application threads (or mutators) can make forward progress while objects are getting migrated. To distinguish the part of the program that does "useful" work from that which does the garbage collection, the term mutator is sometimes used for the "useful" part. In addition, the garbage collection algorithm may also allow garbage collection marking to be done within a huge memory page.

In one embodiment, per-thread checking control may be utilized in a computing system. MCD checking may be enabled for each mutator thread. In various embodiments, there may be a hardware (HW) control register for each running thread (e.g., managed by OS/Hypervisor (HV)). In one embodiment, garbage collection threads that are about to migrate a set of live objects from one memory region to another may issue stores with a special/reserved MCD value so that mutators can trap on that "marked for migration live set" region of the heap. A special store instruction may be utilized that only stores memory versions and leaves application data unchanged. When a heap region is defined as an "MCD region", memory version information of live objects may be flipped using MCD store instructions to avoid any OS/HV application program interface (API) overhead. In one embodiment, a single memory version value may be reserved and used to mark objects considered for migration as "migrated or just about to be migrate". In other embodiments, a plurality of values may be reserved and used to mark objects for migration.

These and other embodiments will become apparent upon reference to the following description and accompanying drawings.

BRIEF DESCRIPTION OF THE DRAWINGS

FIG. 4 is a generalized block diagram illustrating one embodiment of a truth table for a version number mismatch.

Figure 1:
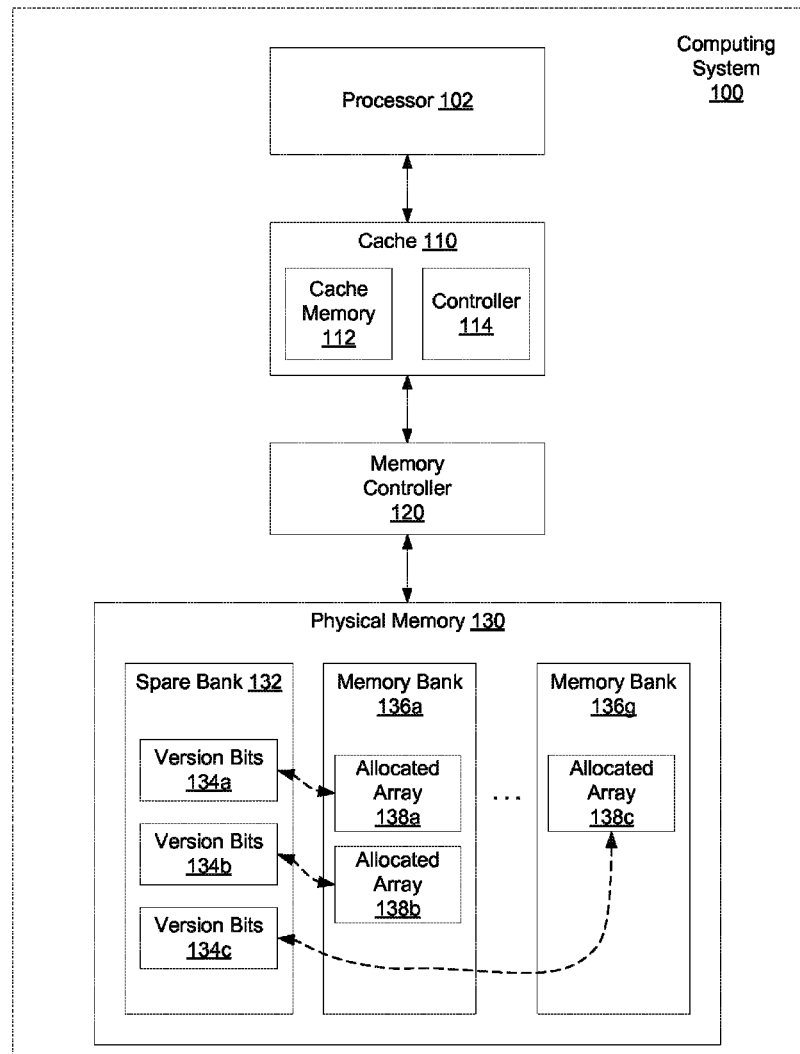
FIG. 1 is a generalized block diagram illustrating one embodiment of a computing system.

While the methods and mechanisms described herein are susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A computing system comprising a physical memory . . . . " Such a claim does not foreclose the computing system from including additional components (e.g., a cache, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring to FIG. 1, a generalized block diagram illustrating one embodiment of a computing system 100 is shown. System 100 includes a processor 102 comprising one or more cores and one or more levels of a cache memory subsystem. System 100 also includes cache 110, which is within the memory subsystem, a memory controller 120 and physical memory 130. Physical memory 130 may be coupled to lower levels of a memory hierarchy, such as a disk memory and offline archive memory. These lower levels of memory are not shown for ease of illustration. Although only one processor 102 is shown coupled with an associated cache 110, it is possible and contemplated system 100 may include multiple processors and multiple associated caches coupled to a crossbar (not shown) to connect these components to one or more memory controllers. The one or more memory controllers are coupled to physical memory 130. In one embodiment, physical memory 130 comprises dynamic random access memory (DRAM). The DRAM may include one or more dual in-line memory module (DIMM) slots.

Each of the one or more cores within the processor 102 may include a superscalar microarchitecture with one or more multi-stage pipelines. Also, each core may be designed to execute multiple threads. For example, a multi-thread software application may have each of its software threads scheduled to be executed on a separate pipeline within a core, or alternatively, a pipeline may process multiple threads via control at certain function units.

In one embodiment, each of the cores within processor 102 includes circuitry for executing instructions according to a predefined general-purpose instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, each of the cores within processor 102 accesses an on-die level-one (L1) cache within a cache memory subsystem for data and instructions. The processor 102 may include multiple on-die levels (L2, L3 and so forth) of caches. If a requested block is not found in the on-die caches or in the off-die cache 110, then a read request for the missing block may be generated and transmitted to the memory controller 120. Interfaces between the different levels of caches may comprise any suitable technology. As shown in cache 110, each level of the caches may comprise a cache memory 112 for storing metadata and data. Additionally, each level may comprise a cache controller 114 for access control of the cache memory 112.

In one embodiment, the physical memory 130 may comprise error-correcting code (ECC) DRAM. The ECC-capable DRAM may detect and correct single-bit data errors and may detect double-bit data errors. Memory errors may be characterized as either soft errors or hard errors. The soft errors may be transient and occasional. With both the node capacitance and the supply voltage decreasing over time with the next generations of new processors, the amount of electrical charge stored on a node decreases. Due to this fact, nodes used for storage are more susceptible to radiation induced soft errors caused by high-energy particles such as cosmic rays, alpha particles, and neutrons. This radiation creates minority carriers at the source and drain regions of transistors to be transported by the source and drain diodes. The change in charge compared to the total charge, which is decreasing with each generation, stored on a node may be a large enough percentage that it surpasses the circuit's noise margin and alters the stored state of the node. Although the circuit is not permanently damaged by this radiation, a logic failure may occur. The hard errors may be permanent and may be found in the silicon or in the metallization of the dynamic RAM (DRAM) packaging.

Regardless of the type of error, the number of data bits in an error may alter the system behavior. Single-bit errors are usually correctable in an ECC memory system. For the above reasons, memories such as the DRAM in physical memory 130 may use error-correcting code (ECC) to detect and correct soft errors. The ECC DRAM may use additional bits called ECC bits to calculate parity information. The parity information is stored with the data bits in the DRAM. In one embodiment, the memory controller 120 calculates the parity information. When data is read from the DRAM, the memory controller 120 computes a new parity value and compares it with a stored parity value for the data being read. If there is a mismatch, then the memory controller 120 may detect the faulty bit and invert it. The error may be reported in a systems management log. If a multi-bit error occurs, the error may be detected and logged but not corrected. Multi-bit errors may be fatal if a system cannot recover from them.

Spare-bank memory and memory mirroring are other advanced mechanisms that enable systems to handle memory errors, such as multi-bit errors. In one embodiment, the physical memory 130 comprises a spare-bank DRAM. The spare-bank memory feature may be implemented in the memory controller 120 and the system basic input/output system (BIOS) software. This feature enables administrators to configure a spare row, or bank, of memory for spare use. It is noted that while the present discussion describes the use of spare memory banks for the storage of version information, the methods and mechanisms described herein are applicable using alternative non-spare bank storage. For example, version information may simply be stored in alternative locations within memory. For example, version information corresponding to an address N may be stored at a given displacement such as N+10000. Alternatively, the location of version information may be stored at a location which is based on another computation related to an access address. In some embodiments, dedicated shadow memory may be utilized to store version information. In various embodiments, version information is stored in such a manner that only a single memory access is required to obtain both the requested data and corresponding version information. For example, the version information may be stored in close proximity to the requested data so that both are obtained in a single access. Numerous such alternatives are possible and are contemplated.

In one embodiment, if a number of correctable errors that occur within a certain time frame on a particular DIMM in any of the usable banks exceeds a given threshold set in the BIOS, then the BIOS instructs the memory controller 120 to copy the data from the failing bank to the spare bank. Then the memory controller 120 remaps the memory in the system. After the copy process has completed, the failing bank is no longer used. Instead the spare bank is used. As shown, the physical memory 130 may be partitioned into multiple logical banks, such as memory banks 136a-136g. The spare bank 132 may be used to replace one of the banks 136a-136g during failure of the one bank.

The physical memory 130 may store one or more software applications (not shown) that are later compiled and loaded into the cache memory subsystem. Generally speaking, for a given software application, the kernel of an operating system sets up an address space for the application, loads the application's code into the physical memory 130, sets up a stack for the application, branches to a given location inside the application, and begins execution of the application. Dynamic objects accessed with pointers may be allocated during program execution. As shown, one or more arrays 138a-138c of bytes may be allocated during the execution of one or more software applications. While the arrays are generally described herein, the methods and mechanisms described are applicable to other types of data structures as well.

In one embodiment, when no hardware failure of the DRAM occurs, each of the allocated arrays 138a-138c has associated version bits of the version bits 134a-134c stored in the spare bank 132. The spare bank 132 may be borrowed for the purpose of storing the version bits to be used for memory corruption detection. An access to a memory location within one of the allocated arrays 138a-138c by a read or a write operation causes the data stored in that memory location to be returned to the processor 102. The associated version bits for the accessed memory location may be returned to the processor along with the data. For example, if a memory location within the allocated array 138a is accessed, then the version bits 134a may be returned to the processor 102 along with the accessed data within the allocated array 138a.

Each memory access may utilize both an address and a version number indicated by the version bits. In one embodiment, when data is written to memory, the hardware in the processor 102, in the cache controller 114 or in the memory controller 120 may verify the version bits from the store operation match the associated version bits recorded in the spare bank 132. When data is loaded, a similar process may occur. An error may be flagged when a mismatch is found.

Dangling pointers, which are also called stale pointers, are costly to detect with dynamic software monitoring tools, since instrumentation slows system performance. As a consequence, silent memory corruption, such as reading and overwriting wrong data and buffer overflows are common sources of software bugs that threaten system availability and security. Reliable memory corruption detection is important for both the operating system (OS) and any database. Notifying a trap handler when a mismatch in the version bits occurs during a memory access allows the OS to take corrective action with little overhead.

In the event of a hardware memory failure in the DRAM in physical memory 130, the spare bank 132 may become active and begin to store program data. In this case, the version bits 134a-134c may no longer be stored and used for memory corruption detection. However, in this case, the system 100 may be soon shutdown, one or more DIMMs in the DRAM may be replaced and the system 100 may be restarted. Afterward, the spare bank 132 may be used again to store version numbers associated with allocated arrays. Before the system shutdown, in one embodiment, the physical memory 130 or the memory controller 120 may return a value of zero to the processor 102 for any associated version number for a memory access. The value of zero may indicate a "not set" state for the version number. In this case the hardware in the processor 102, the cache controller 114 and the memory controller 120 may not compare the version bits provided by the application against those provided by hardware. In one embodiment, the application may continue running although the memory location was not one that was supposed to be accessible through the pointer used by the software. In another embodiment, portions of the spare bank 132 may still store one or more of the version bits 134a-134c during a hardware failure. Returning a state value of "not set" for a given version number may depend on which portion of the spare bank 132 is used for hardware failure and which portion is still used for version number storage.

In various embodiments, garbage collection mechanisms can be implemented by various parts and levels of computing system 100. One approach is to provide garbage collection mechanisms as part of a batch compiler's output. In this approach to garbage collection, in addition to generating code for the functionality supported by an application, the batch compiler may generate code that automatically reclaims unreachable memory space without explicit direction from the programmer, and include it within the application's object code. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

In another embodiment, another approach to garbage collection may be utilized when computing system 100 employs "virtual machines". In this embodiment, a compiler or an interpreter may convert source code for an application from a high-level language to instructions called "byte code" for virtual machines that various processors (e.g., processor 102) can be configured to emulate. One example of a high-level language for which compilers and interpreters are available to produce such virtual-machine instructions is the Java™ programming language. (Java is a trademark or registered trademark of Oracle and/or its affiliates). Typically, byte-code routines are executed by a processor under control of a virtual-machine process, and the virtual machine process provides memory management functions including garbage collection. For example, a memory management component of the virtual machine process may be responsible for allocating memory dynamically as needed and reclaiming unreachable memory when possible. Various other approaches to garbage collection may be employed, including implementation of garbage collection functions in hardware.

While an implementation of automatic garbage collection can greatly reduce the occurrence of memory leaks and other software deficiencies, it can also have significant adverse performance effects if it is not implemented carefully. To distinguish the part of the program that does "useful" work from that which does the garbage collection, the term mutator is sometimes used for the "useful" part; from the collector's point of view, what the mutator does is mutate active data structures' connectivity. The instructions executed by the garbage collector are typically considered memory management overhead, and a variety of garbage collection techniques (such as various types of incremental garbage collection, generational garbage collection, etc.) have been devised to reduce the collection overhead relative to the "useful" work done by the mutator. In general, generational garbage collection refers to techniques where objects in the heap (i.e., the dynamically allocated memory) are segregated into different regions (or "generations"), for example based on how long ago the objects were allocated, and the different regions or generations are managed and collected separately. Generational garbage collection techniques may rely on the general assumption that the age of an object (i.e., how recently the object was originally allocated) affects the probability that the object will remain reachable; e.g., some generational garbage collectors may be configured to concentrate on preferentially collecting regions that contain relatively recently allocated ("young") objects, as recently allocated objects are assumed to become unreachable more quickly than long-lived objects.

Mutator operations may be interleaved with garbage collection operations in a variety of ways—for example, a garbage collector may be periodically or aperiodically activated to perform what is called a garbage collection "cycle" or "interval", during which a portion or all of the heap for a mutator may be examined for unreachable objects, and unreachable objects found may be reclaimed. After the interval completes, the garbage collector may be deactivated until the next interval is triggered, e.g., by detection that insufficient heap memory remains free, or based on a schedule. The mutator may proceed with its operations concurrently with the garbage collection interval in some implementations, while in other implementations mutator operations may be suspended during at least a part of the garbage collection interval. Garbage collection schemes in which mutators are suspended during garbage collection may be referred to as "stop the world" schemes or algorithms. Such schemes require mutators to remain suspended throughout the garbage collection interval.

Many modern mutator applications may be characterized by large amounts of live (i.e., reachable) heap data and considerable thread-level parallelism, and may be run on computing system 100 to achieve desired performance goals. With larger heaps in today's and future servers, these stop the world algorithms are not scalable which results in high and unpredictable pause times. Accordingly, in one embodiment, a hardware-assisted garbage collection algorithm may be executed by computing system 100 to move live objects from one or more memory regions to another "clean" region. While objects are being migrated, the objects may be stored in a compact format in the new, "clean" region to minimize memory fragmentation. In one embodiment, the garbage collection algorithm may fully bypass the OS because live-set marking may use JVM-level load/store instructions to mark the live-set of each memory region that is about to be migrated. The garbage collection algorithm may enable concurrent and continuous fine-grain object migration that scales with application heap sizes so that Java application threads (or mutators) can make forward progress while objects are getting migrated.

In various embodiments, memory version instructions and techniques may be used in conjunction with garbage collection. Such techniques may be referred to as memory corruption detection (MCD) or application data integrity (ADI). In various embodiments, software developers may use such instructions and mechanisms to perform a variety of functions including at least initializing a heap, per-thread checking control, and memory marking. For example, the JVM may be initialized so that memory versioning is enabled on the heap region where objects are managed (allocated). OS system calls may be used to inform the OS about which VA space should be managed as MCD regions. Also, MCD checking may be enabled for each mutator thread. Additionally, various instructions and mechanisms may be used to control which hardware threads are performing MCD checking on loads and stores. In various embodiments, there may be a hardware (HW) control register for each running thread (e.g., managed by OS/Hypervisor (HV)). Still further, garbage collection (GC) threads that are about to migrate a set of live objects from one memory region to another may issue stores with a special/reserved MCD value so that mutators can trap on that "marked for migration live set" region of the heap. MCD defines a special store "flavor" that only stores memory versions and leaves application data unchanged. When a heap region is defined as an "MCD region," developers can flip memory version information with MCD store instructions to avoid any OS/HV API overhead.

As previously described, garbage collection algorithms are frequently moving (or "migrating") live objects from one or more memory regions to another region. In addition to this object migration, objects that are moved may be coalesced in order to store them in a more compact format. In this manner, memory fragmentation may be reduced. Garbage collectors which utilize "stop the world" schemes cause application threads (e.g., JAVA mutators) to fully pause while objects are migrated. With larger heaps in today's and future servers, these stop the world algorithms are not scalable which results in high and unpredictable pause times.

The methods and mechanisms described herein enable concurrent and continuous object migration that scales with application heap sizes. In various embodiments, the operating system may be fully bypassed because live-set marking may use application/JVM-level load/store instructions to mark the live-set of each memory region that is about to be migrated (e.g., as part of garbage collection or some other object migration process).

In one embodiment, a single memory version value may be reserved and used to mark objects considered for migration as "migrated or just about to be migrate". In other embodiments, more values may be used to refine the algorithm and potentially get better performance. Consequently, the algorithm enables continued and concurrent operation so that processes and threads (e.g., Java application threads) can make forward progress while objects are getting migrated.

In addition, garbage collection marking can be done within a huge memory page. This allows end-users to use large pages and with lower performance penalties. Previous solutions include significant OS modifications that possibly open it up for security issues and/or pay a performance cost because large memory pages cannot be used in the application, which end-users are already used to.

As noted, regional garbage collection algorithms divide large heaps into a set of smaller memory regions. Garbage collection threads are concurrently and continuously tracking live-sets (i.e., objects currently in use) of the application and before each region's evacuation can be performed, a live-set for each region is known and stored in a simple array structure. Depending on the size of the machine (threads+heap) an optimal region size may be determined so that memory migration can execute within a per-configured time boundary, say 1-10 ms.

In one embodiment, region marking may use a memory versioning technique, which may be hardware assisted. A garbage collection thread that is about to migrate a region may perform marking with instructions (e.g., MCD store instruction) based on the live-set array contents. Generally speaking, this may be a phase that is just before memory relocation happens on one or more memory regions. Traditionally, all threads would be stopped at this phase and GC threads would move things around and patch live references. In contrast, in one embodiment, the threads may be stopped for a very tiny period of time, and prepare for relocation by flipping the memory versions from unversioned (e.g., 0x0) to a reserved/special value (e.g., Oxa) of each live object in the current heap region.

For example, say a given region is 128 MB large. GC threads have identified the live-set already and on this 128 MB region there may be 5 live objects, for example. Each object is at a different VA location in this region with following sizes: 16Bytes, 42Bytes, 48Bytes, 256Bytes, and 400Bytes. In various embodiments, MCD versions are stored on 64B granularity in memory. So the GC thread would need to cover the VA space of each object by MCD stores in the following way: (1) check the alignment of each object, and (2) if the object is smaller than 64B and it does not cross 64B alignment boundary, issue one MCD store with a special/reserved value.

In the example above, it may be assumed that the 16Bytes and 42Bytes objects are nicely stored in one 64B cache line each so that only one MCD store can be used to flip the memory version. If a 48 Byte object happens to cross a cache line boundary, two MCD stores may be used to cover the entire object—one-byte store at the beginning of these 48Bytes and another one that is touching the crossing byte in the following cache line. For illustration purposes, it may be assumed that the 256 Bytes object happens to be nicely aligned so that 4 MCD stores can cover all underlying cache lines, etc. . . . . When the entire live set in this 128 MB region is marked, the GC can start with the migration phase which may, in one embodiment, involve a traditional GC migration operation.

Each cache line of a live object will get a new memory version so that any following load can trigger a user-level trap routine to resolve the dependency. If a mutator thread happens to touch one of the objects (say the 256Bytes object) while the migration is still happening (e.g., a mutator load), an MCD trap will result because the load is expecting/using memory version zero (encoded in the pointer), while the memory contains a different version (e.g., version Oxa) which was recently flipped by a GC thread doing the migration. So, when this trap happens, there are a few choices: 1) wait until the migration of all 5 objects is done, 2) wait until the migration of 256Bytes is done. When the object is migrated, local GC data structures will have enough information to point a mutator to a new location of that object. The trap handler can follow that new reference and a load containing a new VA of the object can be re-executed. When the entire live-set is marked, all application threads are allowed to keep running There may be a small time period during region migration time that can trigger user-level traps because one of the application (mutator) threads is touching one of the live-set objects from the current region being migrated. A user-level trap handler can resolve that conflict by pointer patching and re-executing from another virtual address (VA) location so that pause times are kept within a pre-determined limit. In some embodiments, a more conservative algorithm can stop all mutators for a tiny period of time when version flipping (described above) is happening. In that case, it is guaranteed that no loads are happening during MCD "memory version spraying" operation.

When all objects are migrated from one region, they may be placed in a compact form in another location and all memory versions may be restored to "normal". Multiple regions can be migrated in parallel to keep up with the application memory pressure.

Figure 2:
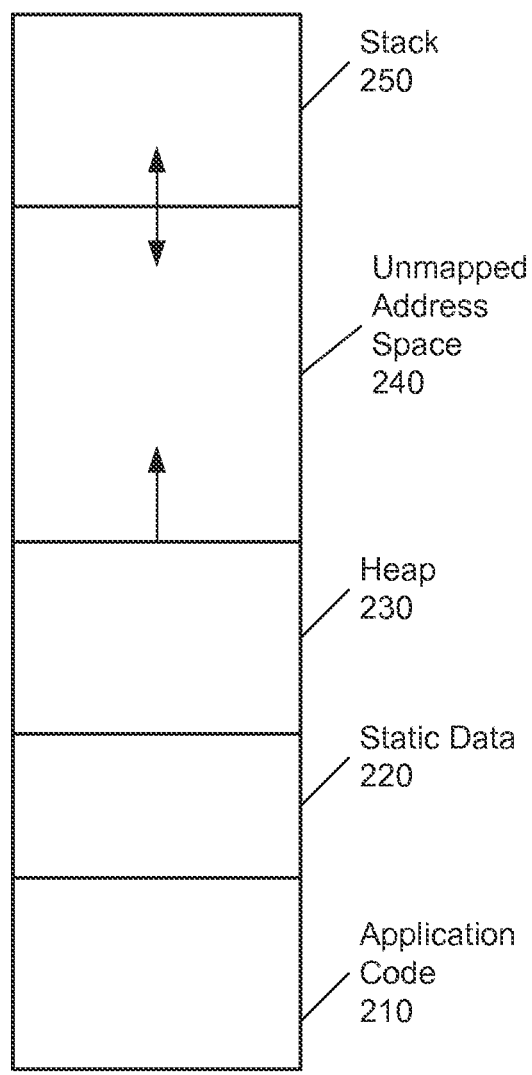
FIG. 2 is a generalized block diagram illustrating one embodiment of a process address space.

Referring now to FIG. 2, a generalized block diagram illustrating one embodiment of a process address space is shown. As described above, the address space for a given process may be a contiguous virtual address space, wherein a mapping between virtual addresses and physical addresses determines the location of data values and application code in physical memory 130. The interaction of compilers and high-level languages affects how a software application uses an instruction set architecture (ISA). Software application development uses a number of variables to be allocated and addressed and a number of registers used to allocate variables. In one embodiment, the static data 220, the stack 250, and the heap 230 determine data allocation for the application code 210.

The static data 220 may be used to allocate statically declared objects, such as global variables and constants. A majority of these objects may be arrays. The stack 250 may be used to allocate scalar variables rather than arrays, such as local variables and parameters in the functions currently being invoked. The stack 250 may be grown and shrunk on procedure call or return, respectively. The heap 230 may be used to allocate dynamic objects accessed with pointers and are typically not scalar variables. The heap 230 may be used to reduce the frequency of copying the contents of strings and lists by storing the contents of temporary strings or lists during the string/list operations. The heap 230 is not affected by the return of the function call.

Figure 3:
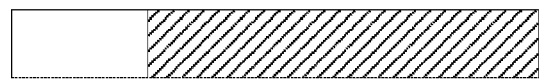
FIG. 3 is a generalized block diagram illustrating one embodiment of memory access address formats.
Figure 3:
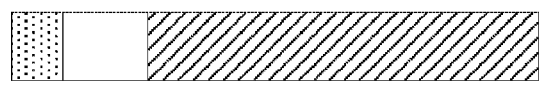
Figure 3:
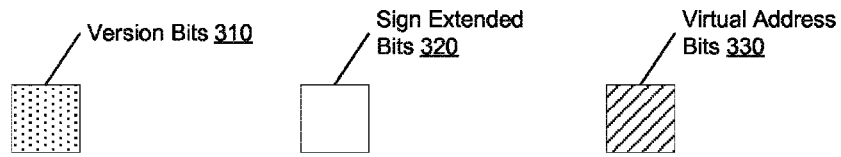

Turning now to FIG. 3, a generalized block diagram illustrating one embodiment of memory access address formats is shown. Modern computing systems use virtual memory in order to share a smaller amount of physical memory among many processes. An address space may be a contiguous virtual address space, wherein a mapping between virtual addresses and physical addresses determines the location of stored data in physical memory.

When software allocates a region of memory, such as with a calloc or a malloc C++ subroutine used for dynamic memory allocation, a version number may be assigned to the allocated array. The subroutine and/or a heap manager may utilize a modified block initialization store instruction within an iterative loop to zero out the allocated array. This modified instruction may operate on a cache line basis. For example, 128 modified block store instructions may be used to allocate an 8-kilobyte (KB) array, wherein each cache line is 64 bytes. In addition, the modified block store instruction may cause an associated version number to be stored in spare bank 132 shown in FIG. 1.

In one embodiment, the OS is made aware of extra metadata being used for memory access operations through a state bit, such as a memory corruption detection (mcd) state bit. In one embodiment, when the mcd state bit is deasserted, the most-significant bit (MSb) of the virtual address bits 330 is sign extended to provide the sign-extended bits 320. In one embodiment, if the bits 320 do not equal a sign-extended value of the MSb of the virtual address bits 330, then an exception may occur.

In one embodiment, when the mcd state bit is asserted, the MSb of the virtual address bits 330 is sign-extended for a smaller portion of the total address. The sign-extended value 320 is smaller in this case. In one embodiment, the upper bits of the memory access address store an associated version number 310 to be used for later comparisons. In one embodiment, the memory access address is a 64-bit value. The virtual address 330 comprises bits 53 to 0. When the mcd state bit is asserted, the sign-extended value 320 comprises bits 59 to 54 and the version number 310 comprises bits 63 to 60. In other embodiments, version number 310 may utilize other numbers of bits besides four, and the other addresses may have other numbers of bits. Although the bits in the memory access addresses are shown in this particular order, other combinations are possible and other or additional bits may be utilized as well. The bits storing information for the portions 310-330 may or may not be contiguous. Similarly, the arrangement of the portions 310-330 may use other placements for better design trade-offs.

Turning now to FIG. 4, a generalized block diagram illustrating one embodiment of a truth table for a version number mismatch is shown. In one embodiment, the possible values for a version number that may be used are in either an available set or a reserved set. The version numbers in a reserved set may indicate either memory is not utilizing version numbers or memory is unable to utilize version numbers. For example, when a hardware failure occurs in the DRAM and a failover mechanism begins to use the spare bank 132, the stored version numbers may not be used anymore. In another example, an uncorrectable error has occurred and the memory does not return valid data.

In one embodiment, one value for the reserved set may be sufficient to handle the conditions described above. However, another version number value may be used in the reserved set to ease software adoption of the mcd state. For example, as shown in FIG. 2, the heap 230 may occupy a lower half of a virtual address space. In such a case, the most-significant bits of an associated virtual address may comprise binary 0's. The stack 250 and shared libraries may occupy an upper half of the virtual address space. The most-significant bits of an associated virtual address may comprise binary 1's. A single version number value in the reserved set may make it difficult for software, such as the OS, to determine if pointers to the upper half of the virtual address space have associated version numbers in the available set. For example, for a 4-bit version number 0xF, wherein 0x denotes a hexadecimal value, this value may indicate either an associated memory access address corresponds to a memory location with a version number equal to 0xF or the memory access address corresponds to a memory location that is not assigned a version number. To simplify logic, both a 0x0 value and a 0xF value may be placed in the reserved set. For the 4-bit version number example, the other values between 0x0 and 0xF may be placed in the available set.

The software may use the version number values in the available set for assigning version numbers to allocated arrays 138a-138c. The values "A" and "B" represent two different members of the available set, but the values A and B do not equal one another.

In one example, when a version number comprises 4 bits, a reserved set may include the 2 values 0x0 and 0xF, and an available set may include the 14 values 0x1 to 0xE.

As shown in the truth table, a version mismatch may occur when a version number in a memory access address corresponding to a load or a store operation from the processor 102 is in the available set, but it does not match the version number stored in the spare bank 132 associated with the memory location identified by the memory access address. In addition, the version number stored in the spare bank 132 is in the available set for a mismatch to occur. When a version number stored in the spare bank 132 is within the reserved set, a mismatch does not occur as shown in the table. When a version number in a memory access address corresponding to a load or a store operation from the processor 102 is in the reserved set, an unexpected condition has occurred. Accordingly, this unexpected occurrence causes a mismatch to be detected.

Figure 5:
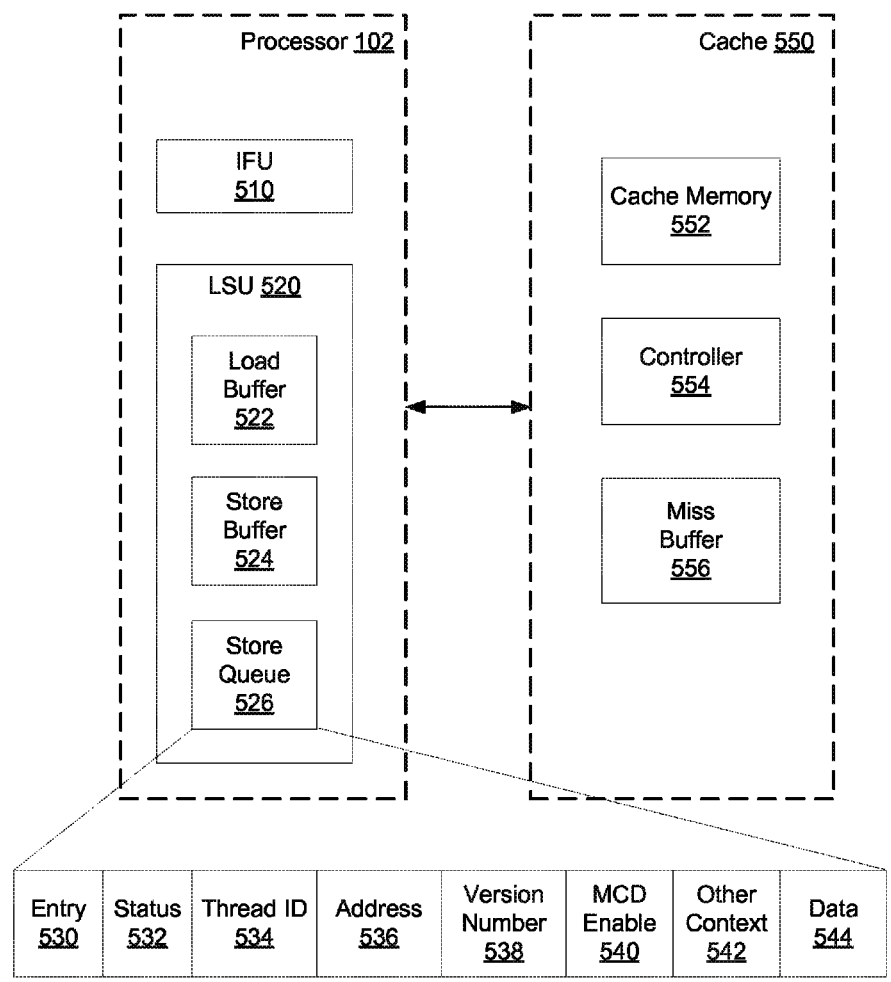
FIG. 5 is a generalized block diagram illustrating one embodiment of a memory interface illustrating different sources of memory requests.

Referring now to FIG. 5, a generalized block diagram illustrating one embodiment of a memory interface illustrating different sources of memory requests is shown. It is noted the components shown in FIG. 5 illustrate a general organization and coupling of components, rather than an actual physical placement of the components. In one embodiment, a cache 550 comprises a cache memory 552, a cache controller 554 and a miss buffer 556. The cache 550 may correspond to an on-core L2 cache with an accompanying miss buffer 556.

Cache memory 550 may be larger than a previous level of memory in the hierarchy, such as an L1 cache in processor 102. Cache memory 550 may contain all of the cache lines of a previous level. In one embodiment, in order to remove complexity from a L1 cache, the L1 cache is implemented as a write-through cache and an L2 cache manages memory ordering and coherency issues. Therefore, memory requests within processor 102 may be sent to both a L1 cache and a L2 cache, such as cache 550.

Memory requests may originate at least from an instruction fetch unit (IFU) 510, a load buffer 522 and a store queue 526 within a load-store unit (LSU) 520. The IFU 510 may be configured to select a thread to be fetched and to fetch instructions from an instruction cache (i-cache) for the selected thread, which may correspond to an L1 cache with a corresponding L2 cache 550. A decoder (not shown) may be coupled to the IFU 510 to determine a type of instruction for each fetched instruction. An execution unit (not shown) in a multi-stage pipeline within processor 102 may generate an address for memory access operations. This address may include at least an associated version number for an array corresponding to the memory access operation. The store queue 526 may be configured to convey memory requests to the same L1 and L2 caches for chosen threads in order to write-out data of committed store instructions for a chosen thread. The load buffer 522 may be configured to convey memory requests to the same L1 and L2 caches for a chosen thread in order to read data of load instructions being executed.

In one embodiment, the miss buffer 556 comprises a plurality of entries that queues all read and write operations, such as load, fetch, and store instructions, which encounter conditions which prevent them from completing. For example, a requested cache line may not be present in cache memory 552. Alternatively, a requested cache line may be present in cache memory, but it does not have a particular cache coherency state. For example, cache memory 552 may be chosen to be a global ordering point for a memory model. In order to adhere to the rules of a memory model, there may need to be a global ordering point within the memory hierarchy, such as cache memory 552 that may be a L2 cache with an associated write-through L1 cache, that serves as the reference for all store operations. This global ordering point may be responsible for ensuring that all consumers will see a consistent and proper ordering of store operations. This is typically accomplished by requiring that a cache line be in an exclusive state before executing a store operation. If a cache line is not in an exclusive state, a cache miss occurs and an updated corresponding cache line may need to be acquired.

In one embodiment, the store queue (SQ) 526 holds all committed store instructions or operations of all threads in processor 102. When a store instruction commits, it typically is moved from the store buffer 524 to the store queue 526. In one embodiment, the store buffer 524 and the store queue 526 store the same fields 530-544. However, when a store instruction commits, the version number 538, the mcd enable state 540, and other context information 542 may no longer be associated with the address 536. Instead this information may be associated with the data 544. The buffered store operations may also be micro-operations, or micro-ops, if processor 102 is configured to divide instructions into two or more operations.

The store queue 526 may be used for read-after-write (RAW) hazard checking as all load instructions, or operations, may check the store queue 526 for RAW hazards prior to being issued. The data 544 holds the data of committed store instructions until these instructions write-out data to cache 550 and the corresponding data of the store instruction are now globally visible to all processors and threads within a computing system. For a particular load instruction, when a RAW hazard is detected in the store queue 526 for a particular entry, which has valid data, bypass may occur immediately.

The store queue 526 comprises a plurality of entries, wherein each entry corresponds to a store instruction. In one embodiment, each entry includes an entry number 530, status information 532, a thread identification (TID) number 534, an address 536, a version number 538, memory corruption detection enable state 540, and other context identifying information 542. The other context information 542 may include mcd enable checking state information on a thread basis. Although the fields are shown in this particular order, other combinations are possible and additional fields may be utilized. The bits storing information for the fields 530-542 may or may not be contiguous. Similarly, the arrangement of fields 530-542 may use other placements for better design trade-offs. The entry number 530 corresponds to the position of an entry in the store queue 526, wherein entry 0 may be configured to be at the top or at the bottom of the store queue 526 depending on logic preferences. The entry field 530 may be implied rather than an actual stored number. A resource tag, or store queue tag, corresponding to a single store instruction in a core pipeline within processor core 102 may be also held per entry in the store queue 526.

Status information 532 may comprise one or more valid bits and cache line MESI protocol information associated with corresponding data stored in the store buffer 524. A thread identifier (TID) 534 may be used to identify a corresponding thread for a particular store operation. In one embodiment, the address field 536 may hold a physical address and a byte mask. Entries may be written upon the retirement of a store instruction. Load instructions may initiate a content-addressable-memory (CAM) comparison operation, typically implemented via dynamic circuit logic, in order to check for an address overlap. In one embodiment, an address overlap occurs when the address 536 matches, the thread ID 534 matches, and any bit in the load mask has a match in the store mask. For entries with address overlap, the CAM will also check for full or partial matches. A full match occurs when each bit in the load mask has a corresponding bit in the store mask. Otherwise, the match is partial. The version number 538, the mcd enable state 540, and the other context information 542 may not participate in a typical CAM operation within the store buffer 524.

Figure 6:
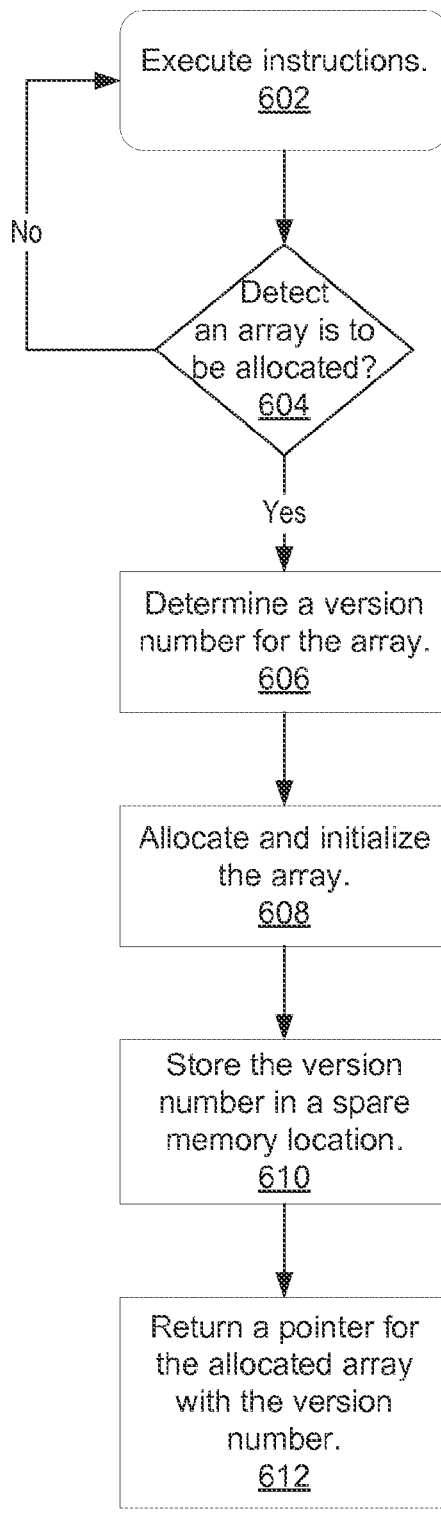
FIG. 6 is a generalized flow diagram illustrating one embodiment of a method for initializing an array with a version number.

Referring now to FIG. 6, a generalized flow diagram illustrating one embodiment of a method for initializing an array with a version number is shown. The components embodied in system 100 described above may generally operate in accordance with method. For purposes of discussion, the steps in this embodiment are shown in sequential order. However, some steps may occur in a different order than shown, some steps may be performed concurrently, some steps may be combined with other steps, and some steps may be absent in another embodiment.

In block 602, the processor 102 may be executing instructions of one or more threads corresponding to one or more software applications. The processor 102 may fetch instructions concurrently for one or more threads. These fetched instructions are decoded. As described earlier, dynamic objects accessed with pointers may be allocated during program execution. In one embodiment, a calloc subroutine or a malloc subroutine used in the C and C++ programming languages is called for dynamic allocation of memory.

If an array of bytes to be allocated is detected during execution (conditional block 604), then in block 606, a version number is determined for the array. As described earlier, version numbers may belong to one of two categories, such as a reserved set and an available set. In one embodiment, a value within the available set of version numbers that has not already been assigned may be chosen. In one embodiment, the OS determines the values within each of the reserved set and the available set and chooses the version number for the array to be allocated. The OS may perform the determination and the selection when the OS receives an indication from the processor 102 that a dynamic memory allocation subroutine is being executed. In another embodiment, the processor 102 determines the values within each of the reserved set and the available set and chooses the version number for the array to be allocated. The processor may send the selected version number with an accompanying indication to the OS that a dynamic memory allocation subroutine is being executed.

In block 608, the subroutine for dynamic memory allocation is executed with a modified block initialization store instruction. The subroutine may use this instruction in an iterative loop. For example, 128 loop iterations, each with the modified block store instruction, may be used to allocate an 8 kilo-byte (KB) array, wherein each cache line allocated by a single iteration is 64 bytes. This modified block initialization instruction may store zeros to the entire cache line pointed to by the variable address. In one embodiment, the version number may be recorded in the upper bits of the address.

In block 610, during execution, the modified instruction may extract these upper bits and place these bits in a memory location in the spare bank 132 associated with a memory location in one of the memory banks 136a-136g identified by the remaining bits of the address. This version number may be carried along with an associated cache line throughout the entire memory system.

When the calloc, malloc or similar subroutine completes, in block 612, the subroutine returns a pointer value and a range of physical memory, which identifies the allocated and initialized array in virtual memory. In one embodiment, a lower portion of a register, such as the lower 54 bits, may be used to identify locations within a virtual memory. The subroutine may return the pointer value with the most significant bits holding the version number. For example, a 64-bit virtual address may hold a 4-bit version number in bits 63 to 60. References to the virtual memory using load and store instructions may be performed with this pointer value and the range of physical memory for the allocated array. Setting the bits in the pointer to hold the version number may be performed using logical operations. Setting the bits in the spare bank 132 in physical memory 130 may be performed by storing the version number value in each memory location in the spare bank 132 corresponding to the allocated array.

Figure 7:
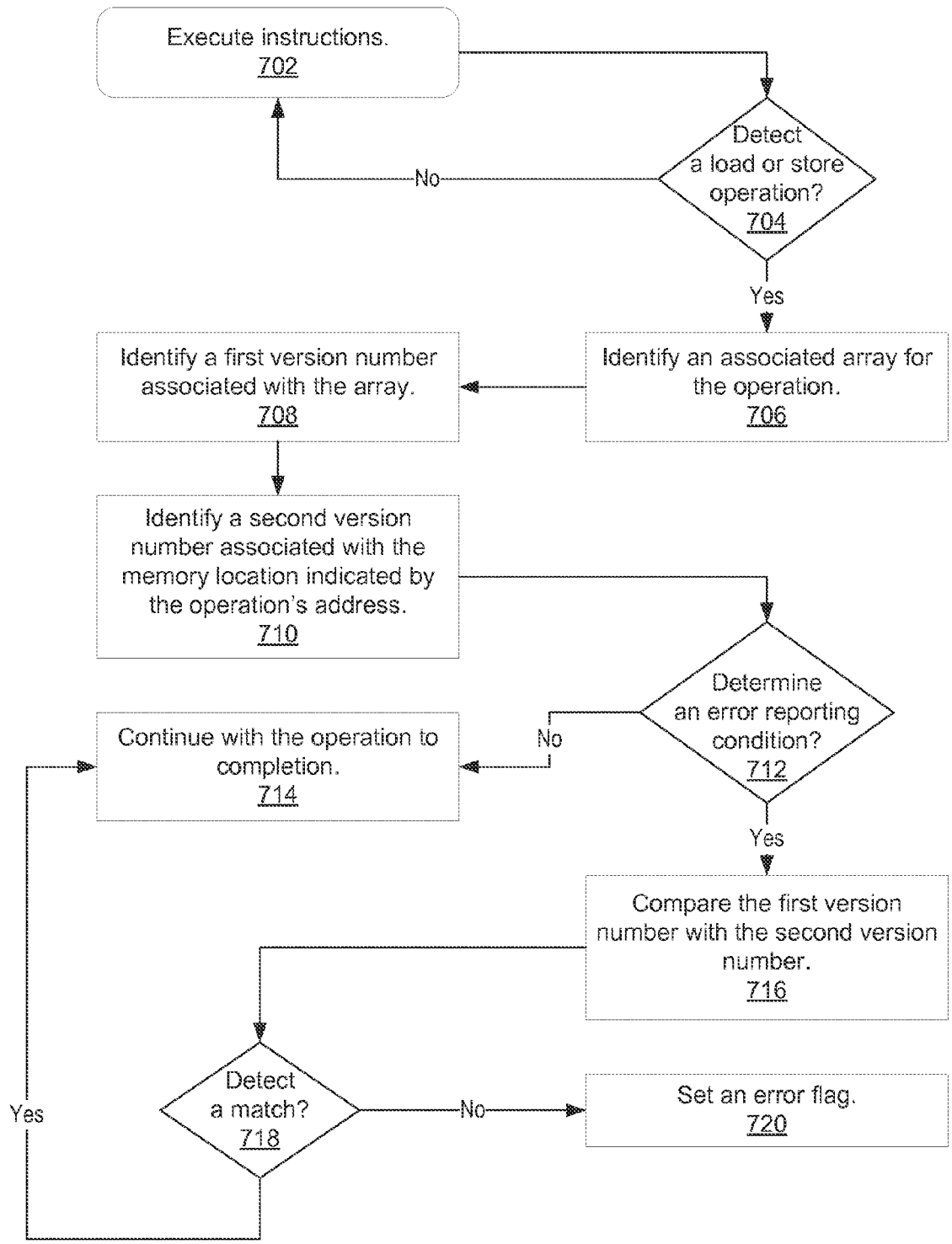
FIG. 7 is a generalized block diagram illustrating one embodiment of a method for executing memory access operations with a version number.

Referring now to FIG. 7, a generalized block diagram illustrating one embodiment of a method for executing memory access operations with a version number is shown. The components embodied in system 100 described above may generally operate in accordance with method. For purposes of discussion, the steps in this embodiment are shown in sequential order. However, some steps may occur in a different order than shown, some steps may be performed concurrently, some steps may be combined with other steps, and some steps may be absent in another embodiment.

Similar to block 602 in the method of FIG. 6, in block 702, the processor 102 may be executing instructions of one or more threads corresponding to one or more software applications. If a memory access operation, such as a load or a store instruction, is detected during execution (conditional block 704), then in block 706, an associated array is identified for the operation. The associated pointer value returned in step 612 in the method of FIG. 6 may be additionally identified in this step.

In block 708, a first version number associated with the array is identified. For example, this first version number may be stored in the upper bits of the pointer value as described above. In block 710, a second version number is identified, wherein the second version number is associated with a memory location indicated by the memory access operation's address. For example, an array may be identified in block 706 and an associated pointer value identified in block 708. This array may hold 100 cache lines of information. The identified pointer value and the size of 100 cache lines may be both used to generate particular addresses. These particular addresses may correspond to memory access operations within an iterative loop in a computer program. For example, the pointer value may identify a cache line at the start of the array, such as Start+0. A cache line at the end of the array may be identified by the generic address Start+99 used as a simple illustration. However, memory corruption may cause an incorrect address to be used and a cache line identified by Start+100 may be accessed during the iterations of the loop.

In one embodiment, a memory corruption error reporting condition may include an asserted mcd state and determination that the second version number stored in memory is not a value in the reserved set. If this error reporting condition is false (conditional block 712), then in block 714, the memory access operation continues to execute to completion. If this error reporting condition is true (conditional block 712), then in block 716, the first version number is compared with the second version number.

In one embodiment, the above comparison is performed for a store instruction when the store instruction commits, reaches the head of the store queue, and is sent by a write-through mechanism to the L2 cache. The first version number is stored in the store address. The second version number is stored in the L2 cache. An associated L2 cache controller may perform the comparison of the first version number and the second version number. For a load instruction, a core within the processor 102 may send a load address with the first version number to the L1 cache. A returned cache line from the L1 cache may store the second version number. The core within the processor 102 may compare the first version number and the second version number. In one embodiment, no comparisons may be performed for prefetched cache lines until an executing computer program actually requests these prefetched lines.

If the above comparison finds a match (conditional block 718), then control flow of the method moves to block 714 where the memory access operation continues to completion. If the above comparison finds a mismatch (conditional block 718), then in block 720, an error flag or trap is set.

In one embodiment, a trap logic unit (TLU) within a core of the processor 102 may be configured to receive notification of an exceptional event occurring during execution of a particular thread, such as the mismatch found during the above comparison. For a load instruction, the mismatch may be found and reported by circuitry within the processor 102 corresponding to a load buffer. For a store instruction, the mismatch may be found and reported by a cache controller associated with the L2 cache as described above. The cache controller may send an indication to a core within the processor 102 corresponding to a found mismatch. The load-store unit (LSU) 520 may store information identifying a given store operation that commits and leaves the store queue 526 in case the given store operation later causes the trap. The identifying information may be used for later debugging processes.

The TLU may cause execution control of that thread to vector to a supervisor-mode software handler (i.e., a trap handler) corresponding to the detected event. In one embodiment, the TLU may be configured to flush all instructions from the trapping thread from any stage of processing within an associated core within the processor 102 without disrupting the execution of other, non-trapping threads.

Figure 8:
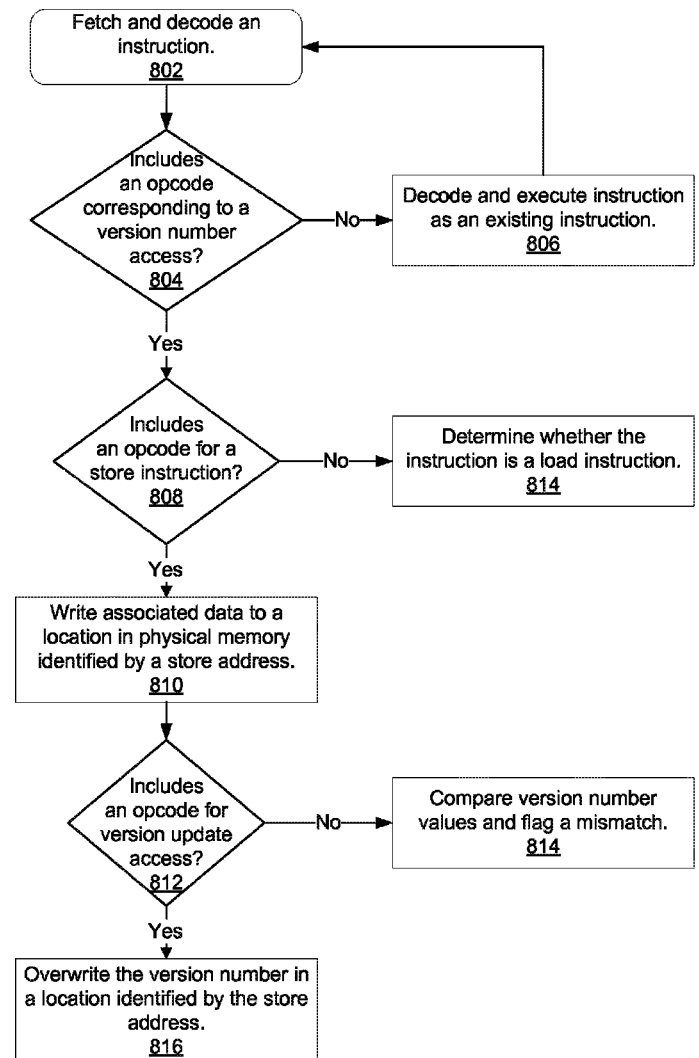
FIG. 8 is a generalized flow diagram illustrating one embodiment of a method for executing memory access operations that update a version number.

Turning now to FIG. 8, a generalized flow diagram illustrating one embodiment of a method for executing memory access operations that update a version number is shown. The components embodied in system 100 described above may generally operate in accordance with method. For purposes of discussion, the steps in this embodiment are shown in sequential order. However, some steps may occur in a different order than shown, some steps may be performed concurrently, some steps may be combined with other steps, and some steps may be absent in another embodiment.

In block 802, a processor may be executing instructions of a software application. An instruction may be fetched alone or in combination with other instructions in a memory line. If an opcode of a fetched instruction corresponds to a version number access (conditional block 804), such as a memory access instruction, then the type of instruction may be next determined. If the opcode of the fetched instruction is not a store instruction (conditional block 808), then in block 814, a decoder may determine whether the fetched memory access instruction is a load instruction. If so, the method may be used to execute the load instruction, which is described further below. If not, then an exception may be flagged, since a memory access instruction may only read or write locations in memory.

If the opcode of the fetched memory access instruction is a store instruction (conditional block 808), then in block 810, the store data when available is written to a location in physical memory identified by a store address. If the instruction is a block initialization store instruction, then the store data may be zeros used to initialize a cache line in a newly allocated array. Otherwise, the store data may correspond to data of a committed store instruction.

If the fetched store instruction does not correspond to a version update access (conditional block 812), then in block 814, the version numbers in the store address and the physical memory may be compared. This step is equivalent to block 716 and subsequent blocks in method. If the fetched store instruction corresponds to a version update access (conditional block 812), then in block 816, the version number in a location identified by the store address may be overwritten with a version number within the store address. This type of store instruction may be used to copy a first region of physical memory to a second region of physical memory. In addition, this type of store instruction may be used to bring a given region of memory from a disk to the physical memory. A comparison of version numbers may not be performed during execution of this type of store instruction.

Figure 9:
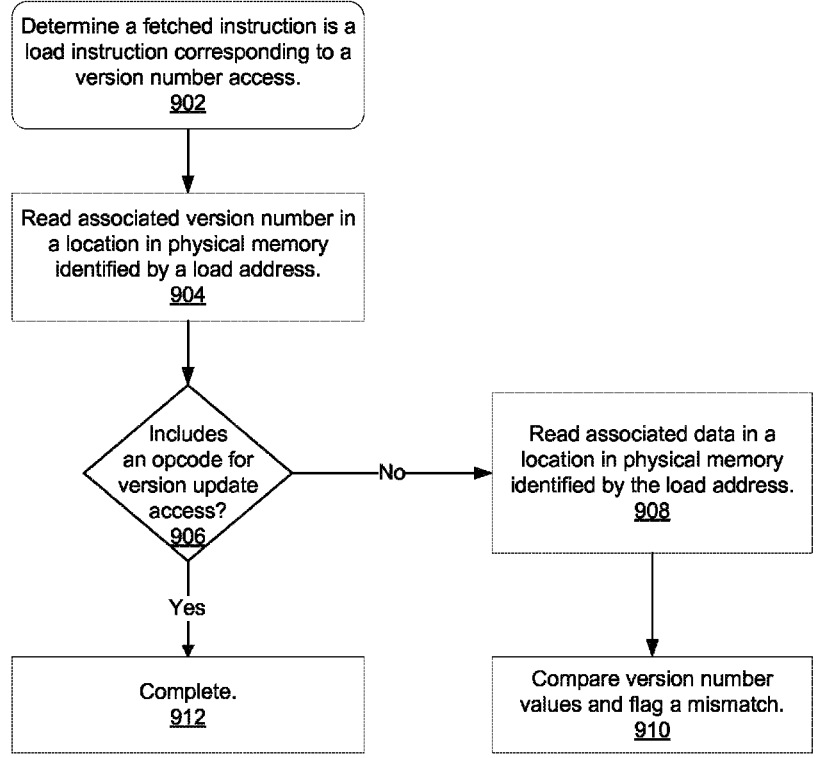
FIG. 9 is another embodiment of a method for executing memory access operations that update a version number.

Turning now to FIG. 9, another embodiment of a method for executing memory access operations that update a version number is shown. The components embodied in system 100 described above may generally operate in accordance with method. For purposes of discussion, the steps in this embodiment are shown in sequential order. However, some steps may occur in a different order than shown, some steps may be performed concurrently, some steps may be combined with other steps, and some steps may be absent in another embodiment.

In block 902, a fetched instruction is determined to be a load instruction corresponding to a version number access. This step may correspond to block 814 in the method of FIG. 8. In block 904, the processor reads a version number from a location in physical memory identified by the load address. If the opcode for the fetched load instruction corresponds to a version update (conditional block 906), then in block 912, execution of the instruction completes when the read version number is stored in a destination register. This load instruction may be used to read the version number for a later store to a different location in physical memory, such as for a copy operation.

If the opcode for the fetched load instruction does not correspond to a version update (conditional block 906), then in block 908, the data in a location in physical memory identified by the load address is read into a destination register. In block 910, the version numbers in the load address and the physical memory may be compared. This step is equivalent to block 716 and subsequent blocks in the method of FIG. 7.

Figure 10:
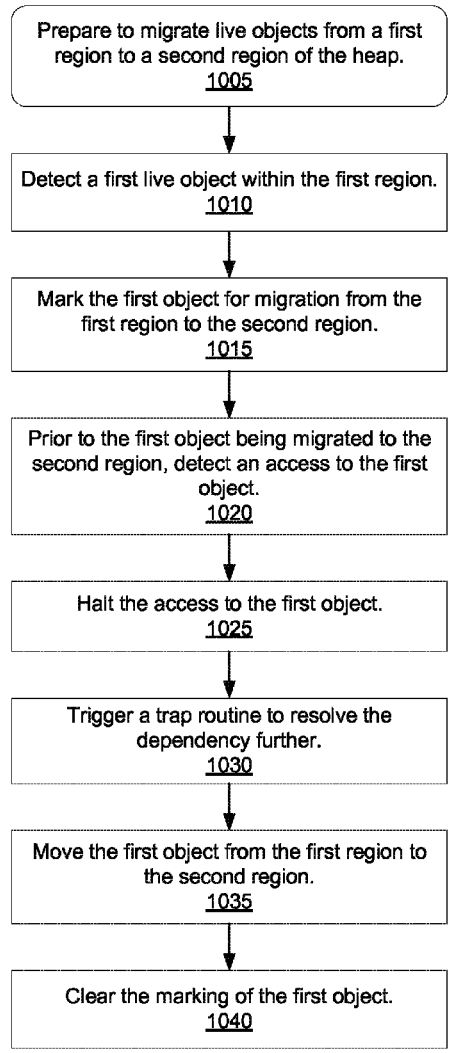
FIG. 10 is a generalized flow diagram illustrating one embodiment of a method for performing hardware-assisted fine-grain object memory migration.

Turning now to FIG. 10, one embodiment of a method 1000 for performing hardware-assisted fine-grain object memory migration is shown. The components embodied in computing system 100 described above (e.g., processor 102) may generally operate in accordance with method 1000. In addition, the steps in this embodiment are shown in sequential order. However, some steps may occur in a different order than shown, some steps may be performed concurrently, some steps may be combined with other steps, and some steps may be absent in another embodiment.

A processor may prepare to migrate live objects from a first region of the heap to a second region of the heap (block 1005). The processor may store a live-set array which tracks the set of live objects within the heap (or individual regions of the heap), and the live-set array may be used to identify the live objects of the first region of the heap. In one embodiment, the processor may execute a plurality of garbage collection threads for performing object migration. Next, the processor may detect a first live object within the first region (block 1010).

Then, the processor may mark the first object for migration from the first region to the second region (block 1015). In one embodiment, marking the first object for migration may entail executing a MCD store instruction to flip the memory version number of the first object from a first version number to a second version number. The MCD store instruction may only store memory versions and may leave application data unchanged. In one embodiment, the memory version number of the first object may be changed to a value reserved for object migration.

Next, prior to the first object being migrated to the second region, the processor may detect an access to the first object (block 1020). In one embodiment, the processor may be configured to detect when there is a memory version number mismatch between the mutator thread and the first object on an access to the first object by a mutator thread. In response to detecting the access, the processor may halt the access to the first object (block 1025). Then, the processor may trigger a trap routine to resolve the dependency further (block 1030). In one embodiment, the user-level trap routine may resolve the conflict of the access by pointer patching and re-executing from another virtual address (VA) location so that pause times are kept within a pre-determined limit. Eventually, the processor may move the first object from the first region to the second region (block 1035). When the first object has been migrated to the second region, the processor may clear the marking of the first object (block 1040). In one embodiment, clearing the marking of the first object may entail flipping the memory version number of the first object from the second version number back to the first version number. After block 1040, method 1000 may end.

Figure 11:
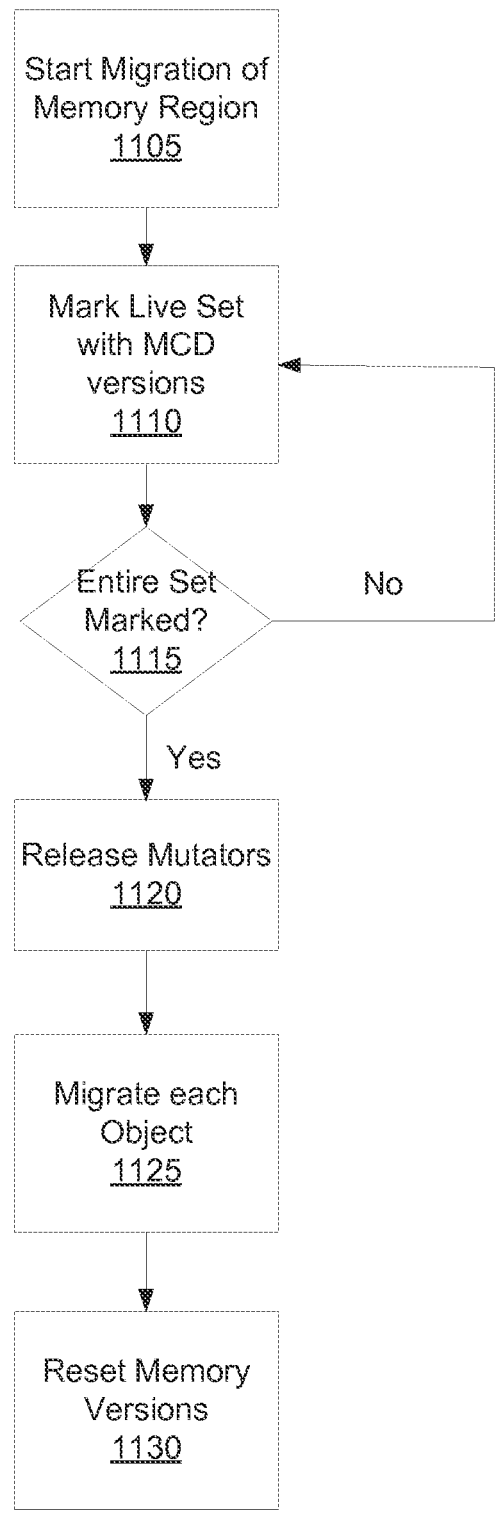
FIG. 11 is a generalized flow diagram illustrating one embodiment of a method for migrating objects from one memory location to another memory location.

Referring now to FIG. 11, one embodiment of a method 1100 for migrating objects from one memory location to another memory location is shown. The components embodied in computing system 100 described above (e.g., processor 102) may generally operate in accordance with method 1100. In addition, the steps in this embodiment are shown in sequential order. However, some steps may occur in a different order than shown, some steps may be performed concurrently, some steps may be combined with other steps, and some steps may be absent in another embodiment.

A processor may execute one or more garbage collection (GC) threads to start the migration of a memory region (block 1105). The processor may mark the live set of the memory region with MCD versions (block 1110). In one embodiment, the migration marking phase may happen under a so called safe point when all mutator threads are paused. This will eliminate conflicts with mutator threads while live set marking is happening. In one embodiment, GC threads may mark all live objects within the memory region by performing a bit-vector traversal. In this embodiment, each bit in a live-set bit vector may represent 8 bytes, 16 bytes, or another amount of data of heap virtual address (VA) space. If the bit is set, the GC thread will store the MCD version on the matching VA space location. The processor may repeat marking until all of the virtual address (VA) space of the live set of the memory region is marked with MCD store instructions (block 1115). After the live set is marked with new memory versions, the processor may release all mutators (block 1120). Then, the processor may migrate each object to another memory location and atomically update a local data structure so that any dependent memory access can point to that new location (inside a trap handler) (block 1125). The trap handler may have the option to migrate a given object if a GC thread did not finish migration. In other words, a mutator thread will become a GC thread for a short period of time. Next, all memory versions of the migrated objects may be cleared back to the "regular" non-trapping version number (e.g., 0x0) (block 1130). After block 1130, method 1100 may end.

Figure 12:
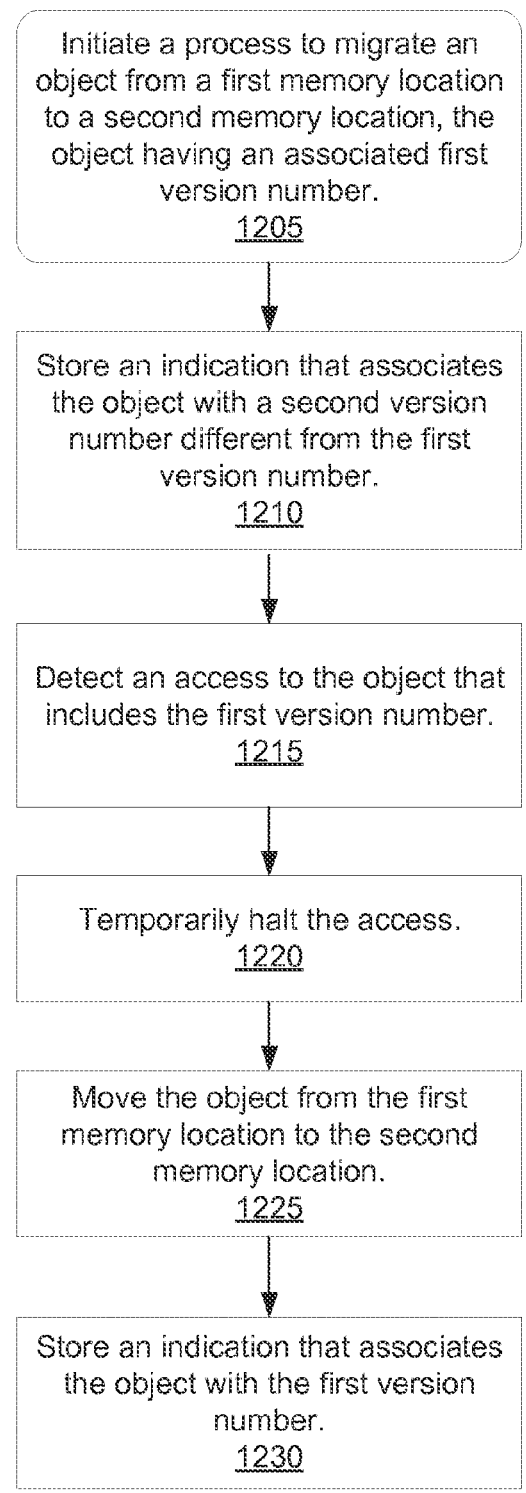
FIG. 12 is a generalized flow diagram illustrating one embodiment of a method for migrating a live object.

Referring now to FIG. 12, one embodiment of a method 1200 for migrating a live object is shown. The components embodied in computing system 100 described above (e.g., processor 102) may generally operate in accordance with method 1200. In addition, the steps in this embodiment are shown in sequential order. However, some steps may occur in a different order than shown, some steps may be performed concurrently, some steps may be combined with other steps, and some steps may be absent in another embodiment.

A processor may initiate a process to migrate an object of one or more objects from a first memory location to a second memory location, the object having an associated first version number (block 1205). Next, the processor may store an indication that associates the object with a second version number different from the first version number (block 1210). Then, the processor may detect an access to the object that includes the first version number (block 1215). In response to detecting the access to the object that includes the first version number, the processor may temporarily halt the access (block 1220). In one embodiment, the processor may also trigger a user-level trap routine to resolve the dependency further in response to detecting the access to the object that includes the first version number.

Next, the processor may move the object from the first memory location to the second memory location (block 1225). Then, the processor may store an indication that associates the object with the first version number (block 1230). After block 1230, method 1200 may end.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a memory; and
a processor coupled to the memory, wherein as part of a garbage collection process, the processor is configured to:
identify a first object in a first region of the memory for migration;
mark the first object for migration from the first region of the memory to a second region of the memory by changing a first version number associated with the first object to a second version number indicating a value reserved for object migration;
detect an access to the first object in the first region prior to the first object being migrated to the second region, wherein said access includes the first version number;
compare the first version number to the second version number;
responsive to detecting the first version number matches the second version number, allow the access to the first object;
responsive to detecting the first version number does not match the second version number, halt the access to the first object;
move the first object from the first region to the second region; and
remove the second version number from the first object responsive to completing migration of the first object to the second region.

2. The computing system as recited in claim 1, wherein the processor comprises a store queue comprising a plurality of entries, wherein each of the plurality of entries is configured to store at least one or more of a thread identifier (ID), a version number, and a memory corruption detection (MCD) enable state indicating whether MCD checking is enabled for a given thread identified by the thread ID.

3. The computing system as recited in claim 1, wherein the first region is a heap region defined as a memory corruption detection (MCD) region.

4. The computing system as recited in claim 1, wherein the processor is configured to utilize a memory corruption detection (MCD) store instruction to change a version number associated with the first object, wherein the MCD store instruction only modifies a version number of a target address and leaves application data of the target address unchanged.

5. The computing system as recited in claim 4, wherein the processor is configured to determine that the access occurred after the first object was marked for migration by detecting a mismatch between a version number of the access and a version number of the first object.

6. The computing system as recited in claim 1, wherein to remove the second version number, the processor is configured to change the second version number to the first version number.

7. The computing system as recited in claim 1, wherein the processor is further configured to trigger a trap routine to resolve a dependency responsive to detecting the access after the first object is marked for migration.

8. A method for a processor, the method comprising:
initiating a garbage collection process, wherein said process comprises:
identifying a first object in a first region of the memory for migration;
marking the first object for migration from the first region of the memory to a second region of the memory by changing a first version number associated with the first object to a second version number indicating a value reserved for object migration;
detecting an access to the first object in the first region prior to the first object being migrated to the second region, wherein said access comprises the first version number;
comparing the first version number to the second version number;
responsive to detecting the first version number matches the second version number, allowing the access to the first object;
responsive to detecting the first version number does not match the second version number, halting the access to the first object;
moving the first object from the first region to the second region; and
removing the second version number from the first object responsive to completing migration of the first object to the second region.

9. The method as recited in claim 8, further comprising storing in each entry of a plurality of entries of a store queue at least one or more of a thread identifier (ID), a version number, and a memory corruption detection (MCD) enable state indicating whether MCD checking is enabled for a given thread identified by the thread ID.

10. The method as recited in claim 9, wherein the first region is a heap region defined as a memory corruption detection (MCD) region.

11. The method as recited in claim 8, further comprising utilizing a memory corruption detection (MCD) store instruction to change a version number associated with the first object, wherein the MCD store instruction only modifies a version number of a target address and leaves application data of the target address unchanged.

12. The method as recited in claim 11, further comprising determining that the access occurred after the first object was marked for migration by detecting a mismatch between a version number of the access and a version number of the first object.

13. The method as recited in claim 11, wherein to remove the second version number, the method further comprises changing the second version number to the first version number responsive to moving the first object from the first region to the second region.

14. The method as recited in claim 8, further comprising trigger a trap routine to resolve a dependency responsive to detecting the access after the first object is marked for migration.

15. A processor configured to:
perform garbage collection, wherein to perform said garbage collection, the processor is configured to:
identify a first object in a first region of the memory for migration;
mark the first object for migration from the first region of the memory to a second region of the memory by changing a first version number associated with the first object to a second version number indicating a value reserved for object migration;
detect an access to the first object in the first region prior to the first object being migrated to the second region, wherein said access comprises the first version number;
compare the first version number to the second version number;

responsive to detecting the first version number matches the second version number, allow the access to the first object;

responsive to detecting the first version number does not match the second version number, halt the access to the first object;

move the first object from the first region to the second region; and remove the second version number from the first object responsive to completing migration of the first object to the second region.

16. The processor as recited in claim 15, wherein the processor comprises a store queue comprising a plurality of entries, wherein each of the plurality of entries is configured to store at least one or more of a thread identifier (ID), a version number, and a memory corruption detection (MCD) enable state indicating whether MCD checking is enabled for a given thread identified by the thread ID.

17. The processor as recited in claim 16, wherein the first region is a heap region defined as a memory corruption detection (MCD) region.

18. The processor as recited in claim 15, wherein the processor is further configured to utilize a memory corruption detection (MCD) store instruction to change a version number associated with the first object, wherein the MCD store instruction only modifies a version number of a target address and leaves application data of the target address unchanged.

19. The processor as recited in claim 18, wherein the processor is further configured to determine that the access occurred after the first object was marked for migration by detecting a mismatch between a version number of the access and a version number of the first object.

20. The processor as recited in claim 18, wherein to remove the second version number, the processor is further configured to change the second version number to the first version number responsive to moving the first object from the first region to the second region.

* * * * *